United States Patent
Flammer, III

(10) Patent No.: US 8,325,060 B2
(45) Date of Patent: Dec. 4, 2012

(54) TRANSPARENT ROUTING IN A POWER LINE CARRIER NETWORK

(75) Inventor: George Flammer, III, Cupertino, CA (US)

(73) Assignee: Silver Spring Networks, Inc., Redwood City, CA (US)

( * ) Notice: Subject to any disclaimer, the term of this patent is extended or adjusted under 35 U.S.C. 154(b) by 595 days.

(21) Appl. No.: 12/563,472

(22) Filed: Sep. 21, 2009

(65) Prior Publication Data

US 2010/0073193 A1    Mar. 25, 2010

Related U.S. Application Data

(60) Provisional application No. 61/099,146, filed on Sep. 22, 2008.

(51) Int. Cl.
G08C 19/04 (2006.01)
G08C 19/10 (2006.01)

(52) U.S. Cl. .............................. 340/870.11; 340/870.01

(58) Field of Classification Search ............. 340/870.11, 340/870.01, 870.02, 870.03
See application file for complete search history.

(56) References Cited

U.S. PATENT DOCUMENTS

| | | | | |
|---|---|---|---|---|
| 7,783,764 B2 * | 8/2010 | Pace et al. | | 709/228 |
| 8,059,011 B2 * | 11/2011 | Van Wyk et al. | | 340/870.11 |
| 8,077,049 B2 * | 12/2011 | Yaney et al. | | 340/660 |
| 2003/0129978 A1 | 7/2003 | Akiyama et al. | | |
| 2003/0179714 A1 | 9/2003 | Gilgenbach et al. | | |
| 2006/0145834 A1 | 7/2006 | Berkman et al. | | |
| 2008/0186203 A1 * | 8/2008 | Vaswani et al. | | 340/870.11 |
| 2009/0267792 A1 * | 10/2009 | Crichlow | | 340/870.02 |
| 2010/0074176 A1 * | 3/2010 | Flammer et al. | | 370/328 |

OTHER PUBLICATIONS

International Search Report in corresponding Application No. PCT/US2009/005244 dated Oct. 28, 2009, 3 pages.

* cited by examiner

*Primary Examiner* — Peguy Jean Pierre

(74) *Attorney, Agent, or Firm* — Buchanan Ingersoll & Rooney PC

(57) ABSTRACT

Meter nodes in a power line carrier (PLC) network may reliably communicate with an access point by alternate routes using additional media where available. A utility network may include one or more subnetworks. Each subnetwork may include one or more meter nodes and an access point configured to communicate with the meter nodes using PLC. Meter nodes operate as relays for other meter nodes to communicate with the access point. Some or all meter nodes may be configured to communicate using a power line carrier communications link and another communications link. The network may also include a node external to the subnetwork, e.g., a utility server. The access point may be configured to communicate with the node external to the subnetwork in addition to the meter nodes.

24 Claims, 2 Drawing Sheets

TRANSPARENT ROUTING IN A POWER LINE CARRIER NETWORK

CROSS-REFERENCE TO RELATED APPLICATIONS

This disclosure claims priority from U.S. Provisional Patent Application No. 61/099,146, filed Sep. 22, 2008, the content of which is hereby incorporated by reference in its entirety.

BACKGROUND

1. Field of the Invention

The disclosed subject matter is generally directed to Advanced Metering Infrastructure (AMI), via which data is communicated between a utility, such as an electric power company, and meters that are located at the premises of the customers of the utility. The exemplary embodiments are particularly aimed at efficient and economical communications between the meters and servers at the back office or other central facility of the utility.

2. Description of Related Art

Power line carrier (PLC) or power line communications, also known as Power line Digital Subscriber Line (PDSL), mains communication, power line telecom (PLT), or power line networking (PLN), is a system for carrying data on a conductor also used for electric power transmission. Broadband over Power Lines (BPL) is an example of a system that uses PLC by sending and receiving information-bearing signals over power lines to provide access to the Internet.

Typically, electrical power is transmitted over high voltage transmission lines, distributed over medium voltage lines, and used inside buildings at lower voltages. Power line communications can be applied at each stage. Most PLC technologies limit themselves to one set of wires, e.g., premises wiring, but some can cross between two stages, e.g., both the distribution network and premises wiring.

Known power line communications systems operate by impressing a modulated carrier signal on the wiring system. Different types of power line communications use different frequency bands, depending on the signal transmission characteristics of the power wiring being used. Since the power wiring system was originally intended for transmission of AC power at a nominal frequency of, e.g., 50 or 60 Hz, the power line circuits have only a limited ability to carry higher frequencies. This propagation problem is a limiting factor for each type of power line communications.

Data rates over a power line communication system vary widely. Low frequency (about 100-200 kHz) carriers impressed on high-voltage transmission lines may carry one or two analog voice circuits, or telemetry and control circuits with an equivalent data rate of a few hundred bits per second. However, these circuits may be many miles long. Higher data rates generally imply shorter ranges. A local area network operating at millions of bits per second may only cover one floor of an office building, but eliminates installation of dedicated network cabling.

Power line communications can also be used to interconnect home computers, peripherals or other networked consumer peripherals. Proprietary specifications for power line home networking have been developed by a number of different companies within the framework of the HomePlug Powerline Alliance, the Universal Powerline Association and the HD-PLC Alliance.

Broadband over power lines (BPL), also known as powerline Internet or powerband, is the use of PLC technology to provide broadband Internet access through ordinary power lines. A computer (or any other device) only needs to plug a BPL "modem" into any outlet in an equipped building to have high-speed Internet access. International Broadband Electric Communications, or IBEC, and other companies currently offer BPL service to several electric cooperatives.

BPL may offer benefits over regular cable or DSL connections: the extensive infrastructure already available enables people in remote locations to access the Internet with relatively little equipment investment by the utility. In addition, such ubiquitous availability would make it much easier for other electronics, such as televisions or sound systems, to be connected.

However, variations in the physical characteristics of the electricity network and the current lack of IEEE standards mean that provisioning of the service is far from being a standard, repeatable process. In addition, the amount of bandwidth a BPL system can provide, compared to cable and wireless, is in question.

Known PLC systems have a number of issues. The primary one is that power lines are inherently a very noisy environment. Every time a device turns on or off, it introduces a pop or click into the line. Energy-saving devices often introduce noisy harmonics into the line. The system must be designed to deal with these natural signaling disruptions and work around them.

Power distribution uses step-down transformers to reduce the voltage for use by customers. However, BPL signals cannot readily pass through transformers, as their high inductance makes them act as low-pass filters, blocking high-frequency signals. Thus, repeaters must be attached to the transformers. Broadband over power lines has developed faster in Europe than in the United States due to a historical difference in power system design philosophies.

In the U.S., it is common for a small transformer hung from a utility pole to service a single house or a small number of houses. In Europe, it is more common for a somewhat larger transformer to service 10 to 100 houses. For delivering power to customers, this difference in design makes little difference for power distribution. However, delivering BPL over the power grid in a typical U.S. city requires an order of magnitude more repeaters than in a comparable European city. On the other hand, since bandwidth to the transformer is limited, this can increase the speed at which each household can connect, due to fewer people sharing the same line. One possible solution is to use BPL as the backhaul for wireless communications, for instance by mounting Wi-Fi access points or cell phone base stations on utility poles, thus allowing end-users within a certain range to connect with equipment they already have. BPL may also be used as a backhaul for WiMAX networks.

Another issue is signal strength and operating frequency. Known systems have operated at frequencies of 10 to 30 MHz, which have been used for many decades by amateur radio operators, as well as international shortwave broadcasters and a variety of communications systems (military, aeronautical, etc.). Power lines are unshielded and will act as antennas for the signals they carry, and have the potential to interfere with shortwave radio communications.

Known technologies that communicate over a shared power line bus have been concerned with the speed and reliability of the communications. Reliability may be addressed through the use of error correction codes and other algorithms designed to mitigate the unique noise environment of the power lines. Frequency adaptive and/or speed variable modulator/demodulators (modems) have been employed to increase reliability as well. For example, modern BPL systems may use OFDM modulation, which allows them to mitigate interference with radio services by removing specific frequencies that are used.

Applications of power line communications vary widely, as would be expected of such a widely available medium. One natural application of narrow band power line communication is the control and telemetry of electrical equipment, such as meters, switches, heaters and domestic appliances. A number of known developments have considered such applications from a systems point of view, such as "Demand Side Management." In this implementation, domestic appliances would intelligently coordinate their use of resources, for example, limiting peak loads.

Control and telemetry applications include both "utility side" applications, which involve equipment belonging to the utility company, i.e., between the supply transformer substation up to the domestic meter, and "consumer-side" applications, which involve equipment in the consumer's premises. Possible utility-side applications include automatic meter reading (AMR), dynamic tariff control, load management, load profile recording, credit control, pre-payment, remote connection, fraud detection and network management, and could be extended to include gas and water.

Utility companies also use special coupling capacitors to connect medium-frequency radio transmitters to the power-frequency AC conductors. Frequencies used are in the range of 24 to 500 kHz, with transmitter power levels up to hundreds of watts. These signals may be impressed on one conductor, on two conductors or on all three conductors of a high-voltage AC transmission line. Several PLC channels may be coupled onto one high voltage line. Filtering devices are applied at substations to prevent the carrier frequency current from being bypassed through the station apparatus and to ensure that distant faults do not affect the isolated segments of the PLC system. These circuits are used for control of switchgear, and for protection of transmission lines. For example, a protection relay can use a PLC channel to trip a line if a fault is detected between its two terminals, but to leave the line in operation if the fault is elsewhere on the system.

FIG. 1 shows an example of a subnetwork 10 in a known AMI system. In this example, each building 12 has a meter node that measures a customer's consumption of a commodity, such as electric power, provided by a utility 14. In addition to the amount of power being consumed, the meter might provide other pertinent data, such as peak consumption for the premises, average consumption for each hour, etc.

All of the meters in a given geographic area constitute end points or nodes that are connected in subnetwork 10 having an access point 16 that provides for egress of the meter data out to the utility 14. In this example, the meters communicate their respective data to the access point or central node 16 by way of PLC. In such an embodiment, the access point 16 may function as an aggregator. The access point 16 includes a suitable mechanism for transmitting the data received from the subnetwork's meters to the utility 14. In a known implementation, this mechanism can include a cellular modem that communicates with the utility 14 over a wide-area network (WAN) by way of a suitable mobile data service, such as GPRS.

In another example, European Patent Pub. No. EP 1 677 270 A1 discloses a system where meters can transmit data to an aggregator via a mix of low power radio or BLUETOOTH, PLC or mobile communications technology, e.g., cellular modems. The aggregator can then subsequently send data to a concentrator via PLC.

Typically, PLC has been used within a single building, home, store or multiple dwelling unit. Whenever meter nodes attempt to communicate outside of the buildings over the low voltage lines, problems related to communications reliability can become more acute for the reasons discussed above.

In some instances, it may not be feasible for most of the devices, such as electricity meters and other infrastructure nodes, to be relocated on the low voltage bus. As a result, they may not be able to communicate reliably to the access point 16.

SUMMARY

The disclosed subject matter can provide a way for nodes in a PLC network to communicate reliably with an access point by alternate routes using additional media where available.

In an exemplary embodiment, a utility network may include one or more subnetworks. Each subnetwork may include one or more meter nodes and an access point configured to communicate with the meter nodes using power line carrier. Selective meter nodes are configured as relays for other meter nodes to communicate with the access point. The selective meter nodes are configured to communicate using a power line carrier communications link and another communications link. The network may also include a node external to the subnetwork, e.g., a utility server. The access point may be configured to communicate with the node external to the subnetwork in addition to the meter nodes.

BRIEF DESCRIPTION OF THE DRAWINGS

As will be realized, different embodiments are possible, and the details disclosed herein are capable of modification in various respects, all without departing from the scope of the claims. Accordingly, the drawings and descriptions are to be regarded as illustrative in nature and not as restrictive. Like reference numerals have been used to designate like elements.

DETAILED DESCRIPTION

The shortfalls discussed above may be addressed by introducing alternate routing, by whatever media is available, between nodes, e.g., utility meters, in a PLC network. Some of these nodes may have an alternate path to the PLC network, such as a broadband Internet connection or a radio frequency (RF) transceiver, or a combination of different paths. With the introduction of routing based on alternate routes over different types of media, nodes that may not be able to communicate directly with the access point using PLC can use intermediary routing nodes to forward traffic.

To facilitate an understanding of the principles upon which the disclosed subject matter is based, exemplary embodiments are described hereinafter with reference to their implementation in an electric power utility system. It will be appreciated that the practical applications of these principles are not limited to this particular type of system. Rather, the principles may be equally employed in any other type of utility, e.g., gas or water, where data pertaining to the consumption of a delivered commodity is obtained at the site of consumption, such as a customer's premises, and communicated to a central location associated with the utility.

Figure 1:
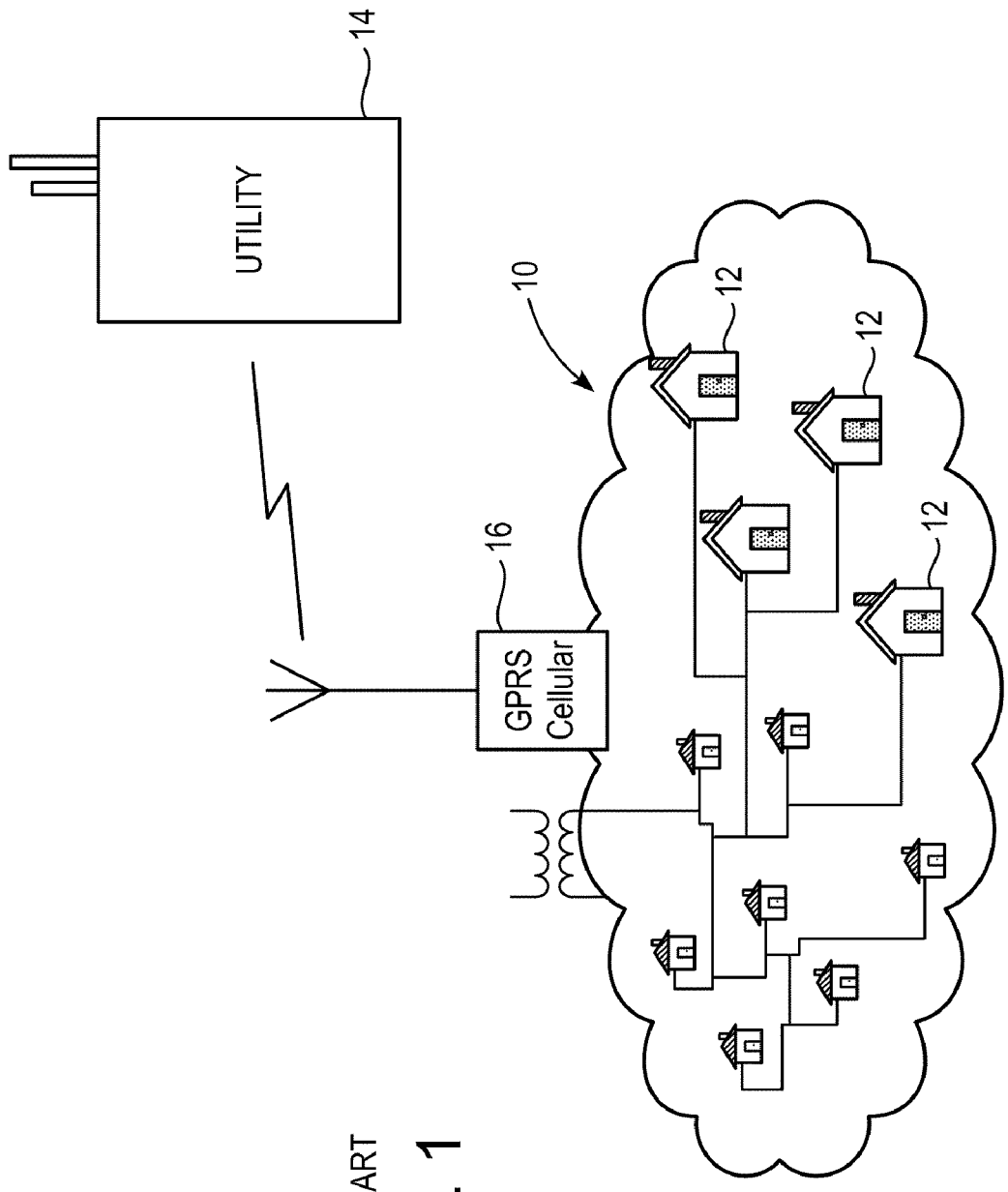
FIG. 1 is a schematic representation of a known metering subnetwork in a utility communications network that employs PLC as the data transport medium.
Figure 2:
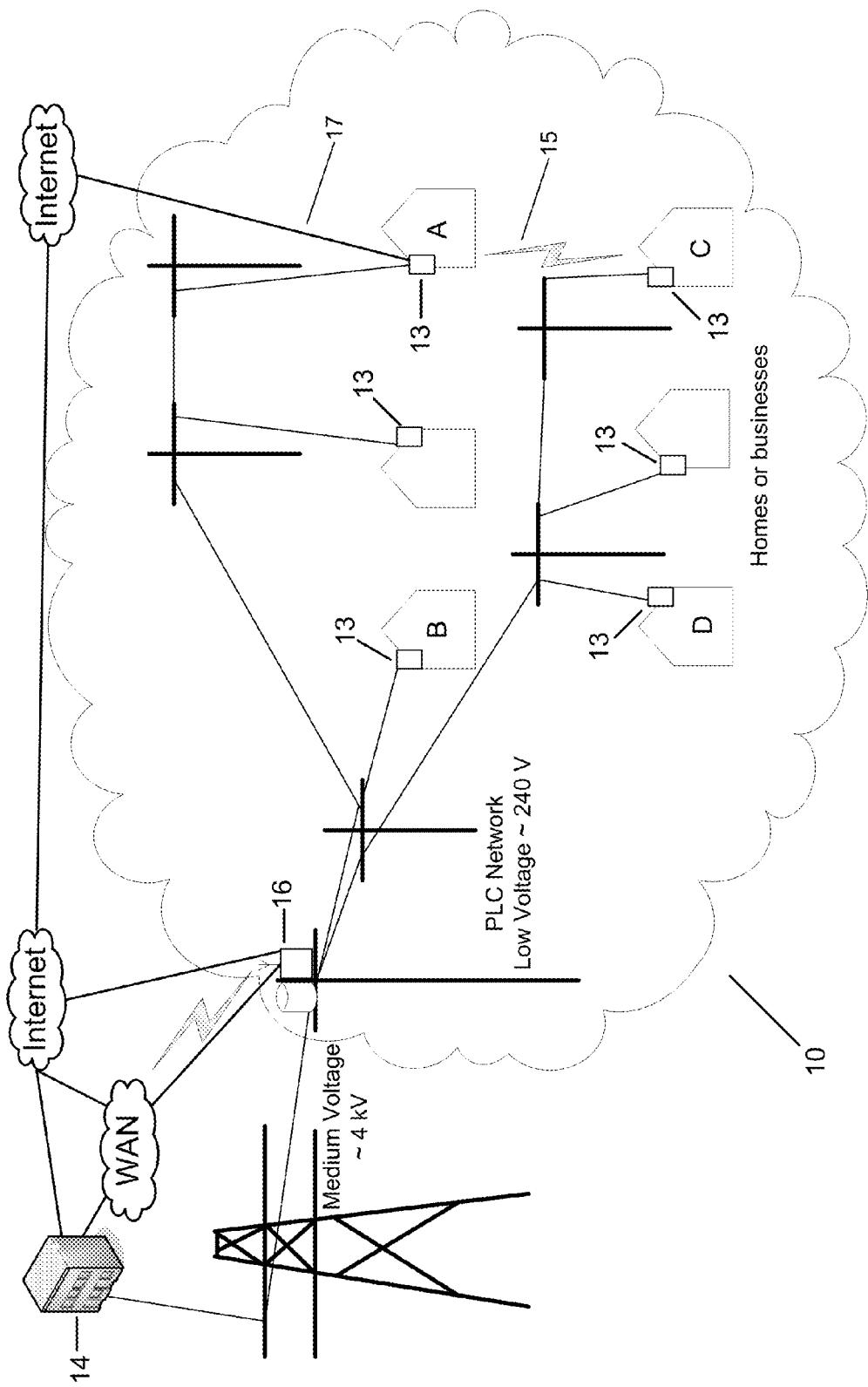
FIG. 2 is a schematic representation of a metering subnetwork using multiple available media, including PLC, for routing.

Referring to the exemplary embodiment shown in FIG. 2, subnetwork 10 includes building A, which may be a house with an AMI-type utility meter node 13, for example. For reasons discussed previously, node 13 may not be able to communicate directly via PLC with the access point or central node 16, for instance because it may be located too far downstream along the transmission path and the signal quality may have deteriorated to an unacceptable level.

In the example shown in FIG. 2, building A's node 13 may have multiple options for communicating with the access point 16. One option may be an indirect PLC path through node 13 in building B. In this case, since building B's node 13 is located between building A's node 13 and the access point 16, it may be sufficiently upstream that it can reliably communicate with the access point 16, while at the same time it is able to exchange data with building A's node 13 via PLC. In essence, node 13 in building B is acting as a PLC relay to retransmit communications between access point 16 and node 13 in building A.

Another option by which building A's meter node 13 can reach the access point 16 is via an RF path 15 to node 13 located at building C. Some or all of the nodes that do not function as an access point or central node 16, e.g., utility meter nodes 13, may be provided with a low-power RF transceiver, for example. Each of these transceivers may be configured to communicate with transceivers at other nodes within radio range. The RF links between the meters 13 may be implemented using a frequency-hopping spread spectrum protocol, for example.

Because of this RF relay link, building C's node 13 may provide a path to access point 16 for building A's node 13, perhaps further relayed through building D's node 13 via PLC, as discussed in the example above, or directly to access point 16 via PLC, depending on PLC network conditions. Other combinations of PLC and non-PLC routes are also possible.

In this example, node 13 in building C is acting as an RF-to-PLC relay between building A's node 13 and access point 16 in the PLC network.

Each low-powered RF transceiver included with nodes 13 may contain, for example, software or hardware that enables them to cooperatively route, e.g. forward, data traffic for each other. Such forwarding may be managed by a central coordinator or may be created ad-hoc, when the transceivers establish local connectivity.

The decision as to which way a particular meter node 13 communicates with the access point 16 may be made at a centralized location, e.g., the access point 16 itself. In this case, the central decision point may selectively activate and deactivate a particular communications path to perform load balancing or to direct traffic.

Alternatively, a decentralized decision-making process may be employed, in which the meter nodes 13 decide which communications path to employ. The activate/deactivate decision may be based on metrics that pertain to various criteria, which may be measured at the meter nodes 13. For example, if the quality, e.g. strength or data rate, of the PLC signal being received at a node falls below a predetermined threshold value, the node can decide on its own to switch to an RF link. This decentralized approach enables the nodes 13 to react quickly to traffic patterns and possible transient situations.

The access point 16 need not be aware of routing between and among meter nodes 13. For example, the meter nodes 13 can be "listening" to communications on the same media as the access point 16. The meter nodes 13 can evaluate the connectivity issues that require assistance in order to perform reliable PLC communication by acting as proxies for downstream nodes. For instance, by listening to communications between the access point and the meter node in building A, the meter node in building B may recognize that the meter node in building A is not responding to messages being sent to it by the access point 16, and/or that the messages being sent to the access point 16 by the meter node in building A are not being acknowledged by the access point. In such a case, the meter node in building B may decide on its own to start operating as a relay between the meter node in building A and the access point. Upon doing so, when it detects a message from the access point that is intended for the meter node in building A, it retransmits the message so that it will have sufficient signal strength to reach the meter node in building A. Messages going in the opposite direction, from the meter node in building A to the access point, can be relayed in a similar manner.

A mix of centralized and decentralized decision-making may also be employed to integrate knowledge that may only be available to the access point 16 with knowledge that may only be available among the meter nodes 13.

The capability of this arrangement can also provide a failure-resistant redundancy that adds robustness to the network. For example, if the PLC service along a particular path experiences degradation or failure, the nodes 13 can switch to another communications path that employs a different medium to maintain communications with the access point 16.

Access point 16 may include a suitable mechanism for transmitting the data received from the subnetwork's meter nodes 13 to the utility 14. As mentioned, this mechanism can include a cellular modem that communicates with the utility 14 over a WAN by way of a suitable mobile data service, such as GPRS. However, any other suitable medium may be employed for this purpose. For example, connectivity to the WAN may be achieved using a fiber optic link. This choice of transport mechanism to the WAN may be selected based upon suitable criteria. Examples of such criteria may include signal strength, available bandwidth, cost of service, traffic load through the access point, reliability, latency, etc.

As with the decision-making involved with communications between the nodes 13 and access point 16, the decision as to which way the access point 16 communicates with the WAN may be made at a centralized location, e.g., the utility 14 itself. In this case, the central decision point may selectively activate and deactivate the particular communications path to perform load balancing, and/or direct traffic to obtain a cost reduction.

Alternatively, a decentralized decision-making process may again be employed, in which the access point 16 for each subnetwork 10 decides which communications path to employ. The activate/deactivate decision can may be based upon metrics that pertain to various criteria, which may be measured at the access point 16.

A mix of centralized and decentralized decision-making may also be employed to integrate knowledge that may only be available to back office systems at the utility with knowledge that may only be available among the access points. If the cellular service experiences a failure, individual subnetworks can switch to another communications path that employs a different medium, such as a fiber optic link, to maintain communications with the utility.

The capability to utilize different media for connection over a WAN to the utility can also provide a significant ability to accommodate post-deployment changes in a cost-effective manner. For example, GPRS data service may become obsolescent, requiring a switch to a newer generation of technology that is supported by a local communications provider, e.g., CDMA/EV-DO or WiMAX.

Other variations of connectivity to the utility via the WAN or Internet are also possible. For instance, a connection to the WAN or Internet may be located within the building of one of the customers in the subnetwork, e.g., using a broadband Internet connection. For example, meter node 13 at building A can function as a bridge and provide data received from other meters in the subnetwork directly to the utility via a broadband Internet connection 17. Similarly, data between nodes 13 and access point 16 may be communicated via a WAN/Internet connection.

In such an embodiment, one or more nodes 13 have the ability to communicate with the utility 14 or access point 16 using a broadband Internet connection, for example. Examples of alternate paths for a broadband Internet connection include a fiber optic link, cable, or DSL, to name a few non-limiting examples. In the case of nodes 13 communicating with utility 14, access point 16 may not be needed to provide transport to the back office of the utility 14 from the nodes 13.

To accomplish the functionality described above, known inexpensive routing hardware and software may be added to some or all of the nodes 13 to establish communications with the back office server of a utility 14. In particular, nodes 13 can provide connectivity that legacy central collector nodes may not support, e.g., due to reasons of architecture or design. The routing equipment can be placed in the communicating endpoints, e.g., meter nodes 13, and can provide cost-effective, retrofitable, scalable routing capability for extant PLC networks.

The routing capability need not be placed in all of the nodes of the PLC network. For example, routing capability may only be present in selective nodes that are appropriately located to function as relays and facilitate communication between the downstream nodes and the central node.

The above description is presented to enable a person skilled in the art to make and use the systems and methods described herein, and is provided in the context of a particular application and its requirements. Various modifications to the embodiments will be readily apparent to those skilled in the art, and the generic principles defined herein may be applied to other embodiments and applications without departing from the spirit and scope of the claims. Thus, there is no intention to be limited to the embodiments shown, but rather to be accorded the widest scope consistent with the principles and features disclosed herein.

What is claimed is:

1. A method of communicating in a utility network having at least one subnetwork that includes a plurality of meter nodes and an access point that communicates with the meter nodes using power line carrier (PLC) communications links, comprising the following steps:
    determining the value of a metric indicative of the quality of a PLC signal between the access point and a meter node; and
    in response to said value falling below a predetermined threshold, relaying communications between the access point and said meter node by means of an alternative communications link other than power line carrier.

2. The method of claim 1,
    wherein at least some of the meter nodes, which are configured as relays, retransmit communications between the access point and at least one other meter node using a power line carrier communications link, and
    wherein each access point operates as an interface between a node external to the at least one subnetwork and the meter nodes of its associated subnetwork.

3. The method of claim 2, wherein each meter node sends or receives data to or from the access point representative of or controlling consumption of a commodity or its usage.

4. The method of claim 3, wherein the commodity is at least one of electricity, gas and water.

5. The method of claim 2 wherein the node external to the subnetwork is a utility server.

6. The method of claim 2, wherein the access point includes an interface for at least one of a cellular modem, a GPRS modem, a fiber optic link, an EV-DO link, a WiMAX link and a broadband internet connection that communicate with the node external to the subnetworks.

7. The method of claim 2, wherein at least one of said meter nodes that is configured as a relay, relays communications to and from another node by a communications link other than power line carrier.

8. The method of claim 7, wherein said at least one meter node communicates with the access point via said other communications link in the event that power line carrier signal quality reaches a predetermined value.

9. The method of claim 7, wherein said at least one meter node includes an RF transceiver that communicates with other meter nodes.

10. The method of claim 9, wherein the RF transceiver implements frequency-hopping spread spectrum communications.

11. The method of claim 7, wherein the other communications link used by said at least one meter node communicates with the node external to the at least one subnetwork without communicating via the access point.

12. The method of claim 1
    wherein at least one of the meter nodes relays communications between the access point and at least one other meter node by an alternative communications link other than power line carrier, and
    wherein each access point operates as an interface between a node external to the at least one subnetwork and the meter nodes of its associated subnetwork.

13. The method of claim 12, wherein each meter node sends or receives data to or from the access point representative of or controlling consumption of a commodity or its usage.

14. The method of claim 13, wherein the commodity is at least one of electricity, gas and water.

15. The method of claim 12 wherein the node external to the subnetwork is a utility server.

16. The method of claim 12, wherein the access point includes an interface for at least one of a cellular modem, a GPRS modem, a fiber optic link, an EV-DO link, a WiMAX link and a broadband internet connection that communicate that communicates with the node external to the subnetworks.

17. The method of claim 12, wherein said at least one meter node communicates with the access point via said other communications link in the event that power line carrier signal quality reaches a predetermined value.

18. The method of claim 12, wherein said at least one meter node includes an RF transceiver that communicates with other meter nodes.

19. The method of claim 18, wherein the RF transceiver implements frequency-hopping spread spectrum communications.

20. The method of claim 12, wherein the other communications link used by said at least one meter node communicates with the node external to the subnetworks without communicating via the access point.

21. The method of claim 1, wherein each meter node sends or receives data to or from the access point representative of or controlling consumption of a commodity or its usage.

22. The method of claim 21, wherein the commodity is at least one of electricity, gas and water.

23. The method of claim 1, wherein said at least one meter node communicates with other meter nodes by means of an RF link.

24. The method of claim 23, wherein the RF link employs frequency-hopping spread spectrum communications.

* * * * *